(12) United States Patent
Walton (10) Patent No.: US 6,973,551 B1
(45) Date of Patent: Dec. 6, 2005

(54) DATA STORAGE SYSTEM HAVING ATOMIC MEMORY OPERATION

(75) Inventor: John K. Walton, Mendon, MA (US)

(73) Assignee: EMC Corporation, Hopkinton, MA (US)

(*) Notice: Subject to any disclaimer, the term of this patent is extended or adjusted under 35 U.S.C. 154(b) by 505 days.

(21) Appl. No.: 10/331,366

(22) Filed: Dec. 30, 2002

(51) Int. Cl.$^7$ .............................................. G06F 12/00
(52) U.S. Cl. ...................... 711/155; 711/104; 711/105; 711/113; 711/154; 711/219; 711/220; 712/221; 712/222; 712/223
(58) Field of Search ......... 711/155, 220; 712/221–224

(56) References Cited

U.S. PATENT DOCUMENTS

| | | | | |
|---|---|---|---|---|
| 4,075,704 A | * | 2/1978 | O'Leary | 708/507 |
| 5,668,967 A | * | 9/1997 | Olson et al. | 710/22 |
| 5,752,273 A | * | 5/1998 | Nemirovsky et al. | 711/201 |

OTHER PUBLICATIONS

Ting-Lu Huang, Dec. 14-16, 1998, IEEE, Pges: 292-299.*

* cited by examiner

*Primary Examiner*—Donald Sparks
*Assistant Examiner*—Hahem Farrokh (57) ABSTRACT

A method and system for enabling a director to perform an atomic read-modify-write operation on plural bit read data stored in a selected one of a plurality of memory locations. The method includes providing a plurality of successive full adders, each one of the full adders being associated with a corresponding one of the bits of the plural bit read data. Each one of the full adders has a summation output, a carry bit input and a carry bit output. The method includes adding in each one of the full adders: (a) a corresponding bit of plural bit input data provided by the director; (b) the corresponding one of the bits of the plural bit read data; and, (c) a carry bit fed the carry bit input from a preceding full adder. Each one of the full adders provides: (a) a carry bit on the carry output thereof representative of the most significant bit produced by the full adder; and, (b) a bit on the summation output representative of a least significant bit produced by the full adder. The bit on the summation output is stored in a corresponding bit location in the selected one of a plurality of memory locations. The method selectively couples, or inhibits coupling, the carry bit produced from one of the full adders to the carry bit input of a next successive full adder selectively in accordance with a corresponding bit of a plural bit carry bit mask provided by the director providing a full adder for each one of the bits of the plural bit read stored. The full adder has a carry bit input and a carry bit output. The method includes adding each one of a bits of plural bit input data provided by the director with a corresponding one of the bits of the plural bit read data in the provided full adder together with a carry bit fed the carry bit input of such provided full adder. The full adder provides: a carry output bit; and, a summation of the bits fed to such provided full adder to the corresponding bit location in the selected one of a plurality of memory locations. The method selectively couples, or inhibits coupling, a carry bit produced by one full adder provided for a lower order bit of the plural bit read data to the carry bit input of a second full adder provided by for next, successive higher order bit of the plural bit read data selectively in accordance with one of a plurality of bits of a carry bit mask provided by the director.

6 Claims, 6 Drawing Sheets

DATA STORAGE SYSTEM HAVING ATOMIC MEMORY OPERATION

INCORPORATION BY REFERENCE

This application incorporates by reference, in their entirety, the following co-pending patent applications all assigned to the same assignee as the present invention:

| INVENTORS | FILING DATE | Ser. No. | TITLE |
|---|---|---|---|
| Yuval Ofek et al. | Mar. 31, 2000 | 09/540,828 | Data Storage System Having Separate Data Transfer Section And Message Network |
| Paul C. Wilson et al. | Jun. 29, 2000 | 09/606,730 | Data Storage System Having Point-To-Point Configuration |
| John K. Walton et al. | Jan. 22, 2002 | 10/054,241 | Data Storage System (Divisional of 09/223,519 filed Dec. 30, 1998) |
| Christopher S. MacLellan et al. | Dec. 21, 2000 | 09/745,859 | Data Storage System Having Plural Fault Domains |
| John K. Walton | May 17, 2001 | 09/859,659 | Data Storage System Having No-Operation Command |

TECHNICAL FIELD

This invention relates generally to data storage systems, and more particularly to data storage systems having atomic memory operations.

BACKGROUND

As is known in the art, large host computers and servers (collectively referred to herein as "host computer/servers") require large capacity data storage systems. These large computer/servers generally includes data processors, which perform many operations on data introduced to the host computer/server through peripherals including the data storage system. The results of these operations are output to peripherals, including the storage system.

One type of data storage system is a magnetic disk storage system. Here a bank of disk drives and the host computer/server are coupled together through an interface. The interface includes "front end" or host computer/server controllers (or directors) and "back-end" or disk controllers (or directors). The interface operates the controllers (or directors) in such a way that they are transparent to the host computer/server. That is, data is stored in, and retrieved from, the bank of disk drives in such a way that the host computer/server merely thinks it is operating with its own local disk drive. One such system is described in U.S. Pat. No. 5,206,939, entitled "System and Method for Disk Mapping and Data Retrieval", inventors Moshe Yanai, Natan Vishlitzky, Bruno Alterescu and Daniel Castel, issued Apr. 27, 1993, and assigned to the same assignee as the present invention.

As is also known in the art, it is frequently desired to read multi-bit data from the memory, modify the read data and write the modified data back into the same memory location from which it was originally read. This operation is sometimes referred to as a read-modify-write operation. As is also known, it is required this read-modify-write operation is an atomic operation because the operation cannot be interrupted until completed. That is, the memory location being read, modified, and re-written is reserved exclusively for this entire operation.

More particularly, a read-modify-write operation may be a sequence of sub-operations, each sub-operation modifying one bit of the multi-bit data. For example, assume the data at a particular address or location in the memory is a sixty-four bit word. Assume the read-modify-write operation requires that bits 2 and 34 are to be modified from a logic 0 to a logic 1. The read-modify-write operation first sets bit 2 to a logic 1 and subsequently sets bit 34 to a logic 1. For this operation to be atomic, it is necessary the 64 bits in the location be unchanged from its original state until completion of the read-modify-write operation. That is, an observer of this location cannot be allowed to obtain data at this location during the time between bit 2 has been set and the time before bit 34 has been set.

One technique used to perform this atomic operation is to read the data at the memory location, place the read data into a buffer while locking the entire memory to prevent access of the entire memory to any other observer, modify the data in the buffer, release the lock on the memory while the modified data in the buffer is written to the location in the memory. Such technique however that all other locations in the memory becoming inaccessible for other operations by other users of the memory.

SUMMARY OF THE INVENTION

In accordance with the present invention, a method is provided for enabling a director to perform an atomic read-modify-write operation on plural bit read data stored in a selected one of a plurality of memory locations. The method includes providing a plurality of successive full adders, each one of the full adders being associated with a corresponding one of the bits of the plural bit read data. Each one of the full adders has a summation output, a carry bit input and a carry bit output. The method includes adding in each one of the full adders: (a) a corresponding bit of plural bit input data provided by the director; (b) the corresponding one of the bits of the plural bit read data; and, (c) a carry bit fed the carry bit input from a preceding full adder. Each one of the full adders provides: (a) a carry bit on the carry bit output thereof representative of the most significant bit produced by the full adder; and, (b) a bit on the summation output representative of a least significant bit produced by the full adder. The bit on the summation output is stored in a corresponding bit location in the selected one of a plurality of memory locations. The method selectively couples, or inhibits coupling, the carry bit produced from one of the full adders to the carry bit input of a next successive full adder selectively in accordance with a corresponding bit of a plural bit carry bit mask provided by the director.

With such method, the carry bit mask provided by the director controls whether the carry bit of one full adder passes to the carry bit input of the next succeeding full adder. Thus, with such method, the modification, for example, summation, may be performed on read data of arbitrary length and position in the selected memory location. Also, multiple portions of the read data may be simultaneously added to corresponding multiple portions of the input data provided by the director.

With such method, the carry bit mask provided by the director control whether the carry bit, i.e., carry bit of the preceding adder, will pass as to the carry bit input of the next higher adder. Thus, inhibiting coupling of an carry bit from coupling to the next succeeding full adder establishes a boundary between the most significant bit of a lower order portion of the read data and the least significant bit of the next higher order portion of such read data. Coupling all carry bits enables the entire read data to be added to the entire input data.

In accordance with another feature of the invention, a method is provided for selectively modifying at least one bit of plural bit data read from a memory. The method includes reading the plural bit data from the memory from a selected one of a plurality of memory addresses. Each one of the bits of the plural bit input data and each one of the bits of the plural bit data read from the memory from the selected one of a plurality of memory addresses are fed to a corresponding one of a plurality of successively coupled full adder sections. Each one of adder sections has: a carry bit input; a carry bit output; and a summation output. The method couples, or inhibits coupling, the carry bit output produced by each one of the carry bit input of the succeeding one of the full adder sections selectively in accordance with a corresponding one of the bits of the plural bit mask data. The method couples the summation output of each one of the full adder sections to a corresponding one of a plurality of bit storage locations in the memory.

In accordance with another feature of the invention, a system is provided, having a memory printed circuit board, such printed circuit board having a memory. The system includes a plurality of directors, each one being coupled to the memory board by a bus. The directors provide control and address signals to the memory to read data stored in such memory and to write data into such memory. The system includes a logic section disposed on the memory printed circuit board. The logic section is coupled between the memory and the plurality of directors. The logic section includes: (a) a write buffer for receiving the write data from the plurality of directors; (b) a read buffer for receiving read data from the memory at an address provided by the address signal, such read buffer providing such read data from the memory to the plurality of directors and to the write buffer; and (c) a read-modify-write unit fed by: the write data and the read data from the memory and received by the read buffer, such read-modify-write unit processing the write data and the read data in the read buffer and the write buffer and for feeding such processed data for storage in such memory at an address provided by the address signal.

With such system, an atomic read-modify-write operation may be performed in response to such operation being requested by one of the plurality of directors without idling other ones of the plurality of directors.

In accordance with another feature of the invention, a read-modify-write system is provided. The section includes: (a) a memory; (b) a write buffer for receiving data, such data comprising: plural bit write data; and plural bit carry bit mask data; (c) a read buffer for receiving plural bit data read from the memory, such read buffer providing such plural bit data read from the memory at an address; and (d) an arithmetic unit fed by: the plural bit write data and the plural bit carry bit mask data received in the write buffer; and, the plural bit data read from the memory and received by the read buffer. The arithmetic unit comprising: a plurality of successively arranged full adder sections, each one of such full adder sections having: a pair of data bit inputs; and a carry bit input. The pair of data bit inputs are coupled to a corresponding one of the plural bits of the write data and a corresponding one of the plural bits of the data received by the read buffer. Each one of the full adder sections produces: a summation bit; and, a carry bit, such summation bit being fed to the memory for storage in such memory at the address.

The arithmetic unit includes a plurality of gates. Each one of the gates has one input fed by the carry bit produced by a preceding one of the successively arranged adder sections and another input fed by a corresponding one of the carry bit mask. Each one of such gates has an output coupled to the carry bit input of a succeeding one of the successively arranged adder section. Each one of such gates passes, or inhibits from passing, the carry bit fed thereto to the output thereof selectively in accordance with the carry bit coupled to the carry bit input thereof.

In accordance with another feature of the invention, a read-modify-write system is provided. The system includes: a memory; a director coupled to the memory for providing control signals to the memory to read data stored in such memory and to write data to be stored in such memory at an address provided by an address signal; and a read-modify-write section coupled between the memory and the director. The read-modify-write section includes: (a) a write buffer for receiving the data from the director, such data comprising: plural bit write data; and plural bit carry bit mask data; (b) a read buffer for receiving plural bit data read from the memory at the address provided by the address signal, such read buffer providing such plural bit data read from the memory to the director and to the write buffer; and, (c) an arithmetic unit fed by: the plural bit data and the plural bit carry bit mask data received in the write buffer; and, the plural bit data read from the memory and received by the read buffer. The arithmetic unit includes a full adder. The full adder includes a plurality of successively arranged full adder sections. Each one of such full adder sections includes a pair of data bit inputs and a carry bit input. The pair of data bit inputs are coupled to a corresponding one of the plural bits of the write data and a corresponding one of the plural bits of the data received by the read buffer. Each one of the full adder sections produces: a summation bit; and, a carry bit. The summation bit is fed to the memory for storage in such memory at the address provided by the address signal. The system includes a plurality of gates. Each one of the gates has one input fed by the carry bit produced by a preceding one of the successively arranged adder sections and another input fed by a corresponding one of the carry bit mask. Each one of such gates has an output coupled to the carry bit input of a succeeding one of the successively arranged adder section. Each one of such gates passes, or inhibits from passing, the carry bit fed thereto to the output thereof selectively in accordance with the carry bit coupled to the carry bit input thereof.

The details of one or more embodiments of the invention are set forth in the accompanying drawings and the description below. Other features, objects, and advantages of the invention will be apparent from the description and drawings, and from the claims.

DESCRIPTION OF DRAWINGS

These and other features of the invention will become more readily apparent from the following detailed description when read together with the accompanying drawings, in which.

DETAILED DESCRIPTION

Figure 1:
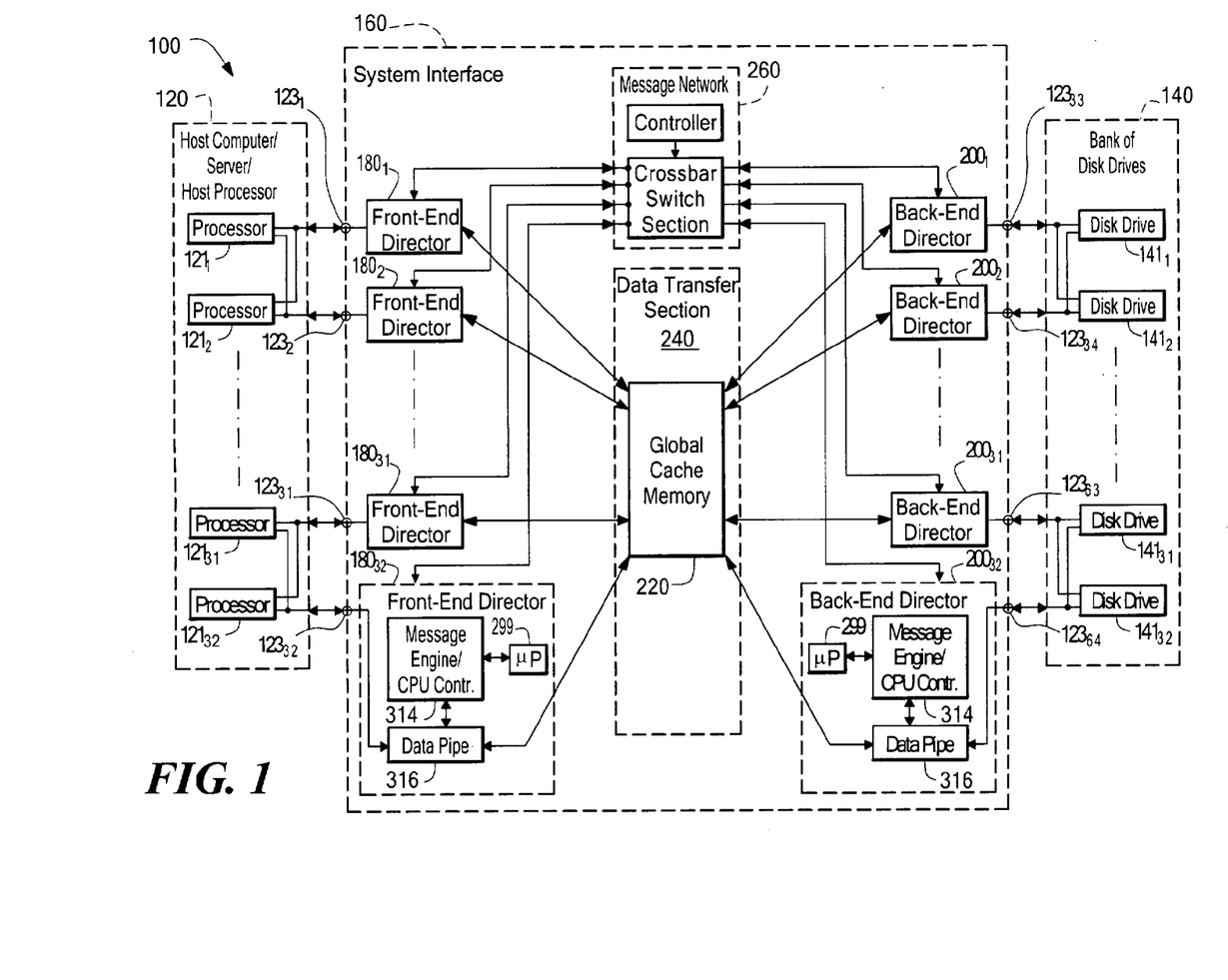
FIG. 1 is a block diagram of a data storage system according to the invention.

Referring now to FIG. 1, a data storage system 100 is shown for transferring data between a host computer/server 120 and a bank of disk drives 140 through a system interface 160. The system interface 160 includes: a plurality of, here 32 front-end directors (sometimes referred to as processors or controllers) $180_1$–$180_{32}$ coupled to the host computer/server 120 via ports $123_1$–$123_{32}$; a plurality of back-end directors $200_1$–$200_{32}$ coupled to the bank of disk drives 140 via ports $123_{33}$–$123_{64}$; a data transfer section 240, having a global cache memory 220, coupled to the plurality of front-end directors $180_1$–$180_{16}$ and the back-end directors $200_1$–$200_{16}$; and a messaging network 260, operative independently of the data transfer section 240, coupled to the plurality of front-end directors $180_1$–$180_{32}$ and the plurality of back-end directors $200_1$–$200_{32}$, as shown. The front-end and back-end directors $180_1$–$180_{32}$, $200_1$–$200_{32}$ are functionally similar and include a microprocessor ($\mu$P) 299 (i.e., a central processing unit (CPU) and RAM), a message engine/CPU controller 314 and a data pipe 316, described in detail in the co-pending patent applications referred to above. Suffice it to say here, however, that the front-end and back-end directors $180_1$–$180_{32}$, $200_1$–$200_{32}$ control data transfer between the host computer/server 120 and the bank of disk drives 140 in response to messages passing between the directors $180_1$–$180_{32}$, $200_1$–$200_{32}$ through the messaging network 260. The messages facilitate the data transfer between host computer/server 120 and the bank of disk drives 140 with such data passing through the global cache memory 220 via the data transfer section 240. More particularly, in the case of the front-end directors $180_1$–$180_{32}$, the data passes between the host computer to the global cache memory 220 through the data pipe 316 in the front-end directors $180_1$–$180_{32}$ and the messages pass through the message engine/CPU controller 314 in such front-end directors $180_1$–$180_{32}$. In the case of the back-end directors $200_1$–$200_{32}$ the data passes between the back-end directors $200_1$–$200_{32}$ and the bank of disk drives 140 and the global cache memory 220 through the data pipe 316 in the back-end directors $200_1$–$200_{32}$ and again the messages pass through the message engine/CPU controller 314 in such back-end director $200_1$–$200_{32}$.

Figure 2:
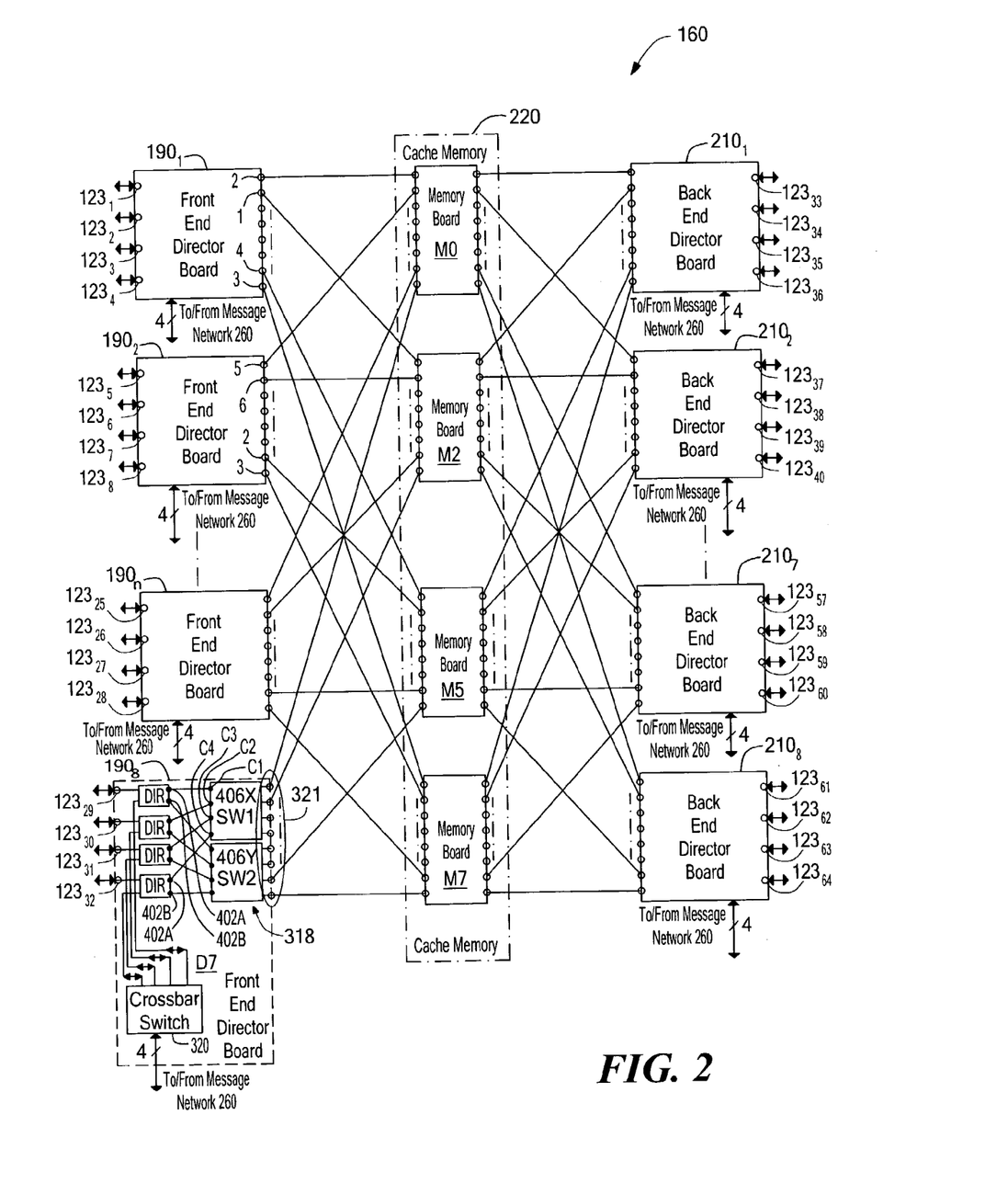
FIG. 2 is a block diagram of a portion of a system interface used in the data storage system of FIG. 1.

Referring now to FIG. 2 the system interface 160 is shown to include a plurality of, here eight front-end director boards $190_1$–$190_8$, each one having here four of the front-end directors $180_1$–$180_{32}$; a plurality of, here eight back-end director boards $210_1$–$210_8$, each one having here four of the back-end directors $200_1$–$200_{32}$; and a plurality of, here eight, memory boards M0–M7 which together make up the global cache memory 220. As described in more in the co-pending patent applications referred to above, each one of the director boards $190_1$–$210_8$ includes, as noted above four of the directors $180_1$–$180_{32}$, $200_1$–$200_{32}$ (FIG. 1). It is noted that the director boards $190_1$–$190_8$ having four front-end directors per board, $180_1$–$180_{32}$ are referred to as front-end directors and the director boards $210_1$–$210_8$ having four back-end directors per board, $200_1$–$200_{32}$ are referred to as back-end directors. Each one of the directors $180_1$–$180_{32}$, $200_1$–$200_{32}$ includes the microprocessor 299 (referred to above), the message engine/CPU controller 314, and the data pipe 316 shown in FIG. 1.

The front-end director boards have ports $123_1$–$123_{32}$, as shown in FIG. 1, coupled to the processors $121_1$–$121_{32}$, as shown. The back-end director boards have ports $123_{33}$–$123_{64}$, as shown in FIG. 1, coupled to the disk drives $141_1$–$141_{32}$, as shown.

Each one of the director boards $190_1$–$190_8$ and $210_1$–$210_8$ includes a crossbar switch 318 having a pair of crossbar switches 406X, 406Y. Each one of the switches 406X, 406Y includes four input/output director-side ports $C_1$–$C_4$ and the four input/output memory-side ports collectively designated in FIG. 2 by numerical designation 321. The director-side ports $C_1$–$C_4$ of switch 406X are connected to the four directors on the director board, as indicated, and as described in more detail in the co-pending patent applications referred to above. Likewise, director-side ports $C_1$–$C_4$ of switch 406Y are also connected to the dual-ported directors on such board, as indicated. Thus, as described in the co-pending patent applications referred to above, each director is a dual-ported directors.

Each one of the ports $C_1$–$C_4$ may be coupled to a selected one of the four ports collectively designated by 321 in accordance with control words provided to the switch 406X by the directors on such board, respectively, as described in the above-referenced patent application. Suffice it to say here, that port 402A of any one of the directors $180_1$, $180_3$, $180_5$, $180_7$ may be coupled to any one of the ports 321 of switch 406X, selectively in accordance with the control words. Likewise for switch 406Y. Further details described in the co-pending patent applications referred to above.

The global cache memory 220 includes a plurality of, here eight, cache memory boards M0–M7, as shown. Still further, referring to FIG. 3, an exemplary one of the cache memory boards, here memory board M0, is shown. Here, each cache memory board includes four memory array regions 1–4, an exemplary one thereof being shown and described in connection with FIG. 3. Reference is made to U.S. Pat. No. 5,943,287 entitled "Fault Tolerant Memory System", John K. Walton, inventor, issued Aug. 24, 1999 and assigned to the same assignee as the present invention, the entire subject matter therein being incorporated herein by reference. Further detail of the exemplary one of the cache memory boards is described in the co-pending patent applications referred to above. This, each one of the memory boards M0–M7 has sixteen ports P. Each one of the sixteen ports P is connected to a corresponding one of the sixteen director boards $190_1$–$190_8$ and $210_1$–$210_8$. Each one of the sixteen director boards $190_1$–$190_8$ and $210_1$–$210_8$ is able to couple one of the four directors thereon to any one of the eight memory boards M0–M7. For example, any one of the four directors on board $190_8$ may be coupled to any one of the four memory boards M0–M7 through the switches 406X and 406Y. Thus, as described in more detail in the co-pending patent applications referred to above, each one of the directors on each one of the director bards may be selectively coupled to each one of the memory boards, and more particularly, to each one of the memory array regions 1–4 in the cache memory 220. Thus, each one of the array regions 1–4 may receive data from, or send data to, any one of the sixty-four directors.

Figure 3:
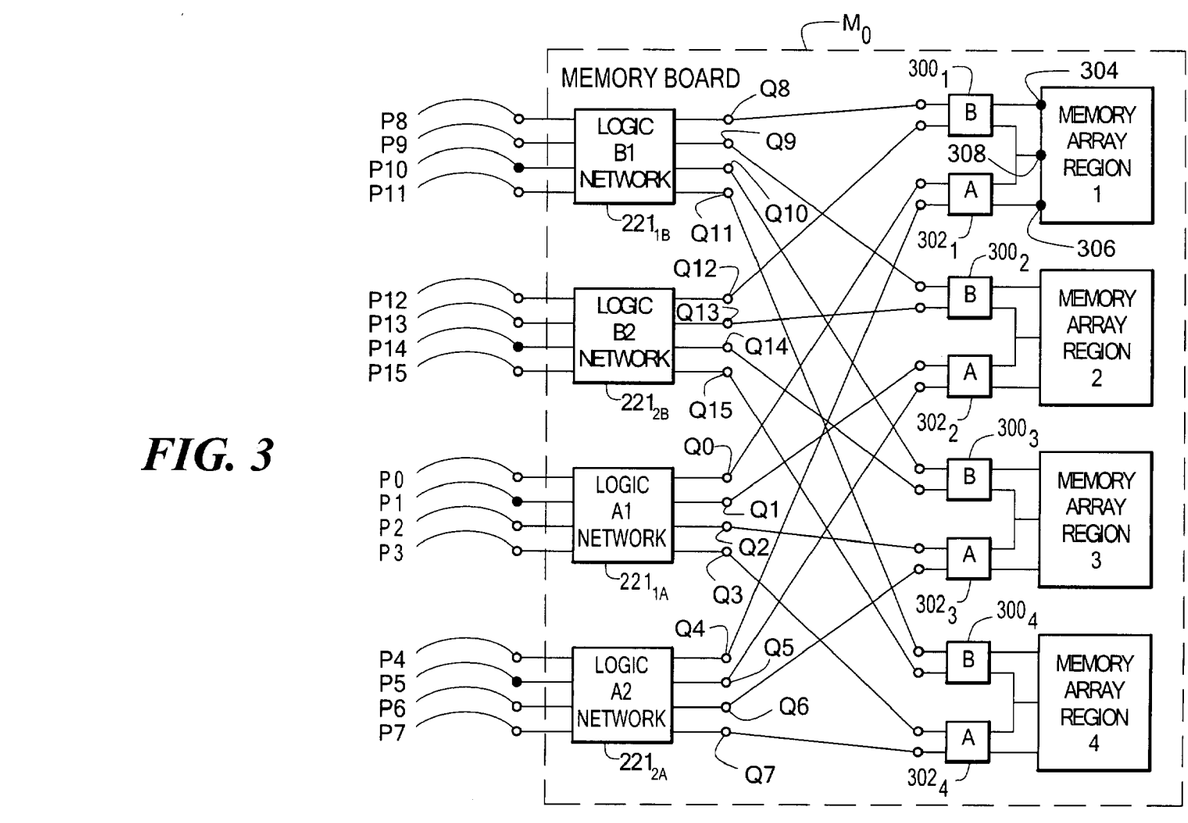
FIG. 3 is a diagram of an exemplary global cache memory printed circuit board used in the system interface of FIG. 1.

As shown in FIG. 3, the exemplary memory board includes a plurality of, here four RAM memory array regions 1–4, each one of the array regions has a pair of redundant data/control logic section, i.e., an A port logic section and a B port logic section, for receiving data to, or from, the memory array region as well as for receiving memory control signals. The memory board itself has, as noted above in connection with FIG. 2, sixteen ports P; a set of eight domain A ports P, here designated as ports $P_0$–$P_7$ and a set of eight domain B ports P, here designated as ports $P_8$–$P_{15}$. As described in more detail in the co-pending patent applications referred to above and in the above-reference U.S. patent, each memory board has four logic networks (here crossbar switches). These four logic networks $221_{1A}$, $221_{2A}$, $221_{1B}$, $221_{2B}$, are here cross bar switches. Logic networks $221_{1A}$, $221_{2A}$, and logic networks $221_{1B}$, $221_{2B}$, are in two independent domains, i.e., domain A and domain B. Thus, logic networks $221_{1A}$, $221_{2A}$, are in domain A and logic networks $221_{1B}$, $221_{2B}$ are in domain B, respectively. The connections between memory boards M0 through M7 and director boards $190_1$–$190_8$ and $210_1$–$210_8$ and a more complete description of the two independent domains are described in more detail in the co-pending patent applications. Suffice it to say here that logic network $221_{1B}$ is adapted to couple any one the ports P, thus here any one of the ports P8, P9, P10 and P11 to any one of the four ports Q8–Q11 of such logic network $221_{1B}$. In like manner, logic network $221_{2B}$ is adapted to couple any one the ports P, thus here any one of the ports P12, P13, P14 and P15 to any one of the four ports Q12–Q15 of such logic network 221; logic network $221_{1A}$ is adapted to couple any one the ports P, thus here any one of the ports P0, P1, P2 and P3 to any one of the four ports Q0–Q3 of such logic network; and logic network $221_{2A}$ is adapted to couple any one the ports P, thus here any one of the ports P4, P5, P6 and P7 to any one of the four ports Q4–Q7 of such logic network.

Also included on each one of the memory printed circuit boards is a set of four domain B memory control/data sections $300_1$–$300_4$ and a set of four domain A memory control/data sections $302_1$–$302_4$. As noted above, the memory board M0 includes four memory array regions 1–4. Each memory array region has a DATA input coupled to both domain B memory control/data section $300_1$ and domain a memory control/data section $300_2$. Further, each one of the domain B and domain A memory control/data sections $300_1$, $300_2$ is coupled to a different pair of the logic networks $221_{1B}$, $221_{2B}$, $221_{1A}$, and $221_{2A}$. Thus, each one of the array regions 1–4 may receive data from, or send data to, any one of the sixty-four directors. For example, domain B memory control/data section $300_1$ is coupled to network $221_{1B}$ and $221_{2B}$ while domain A memory control/data section $300_2$ is coupled to network $221_{1A}$ and $221_{2A}$.

Figure 4:
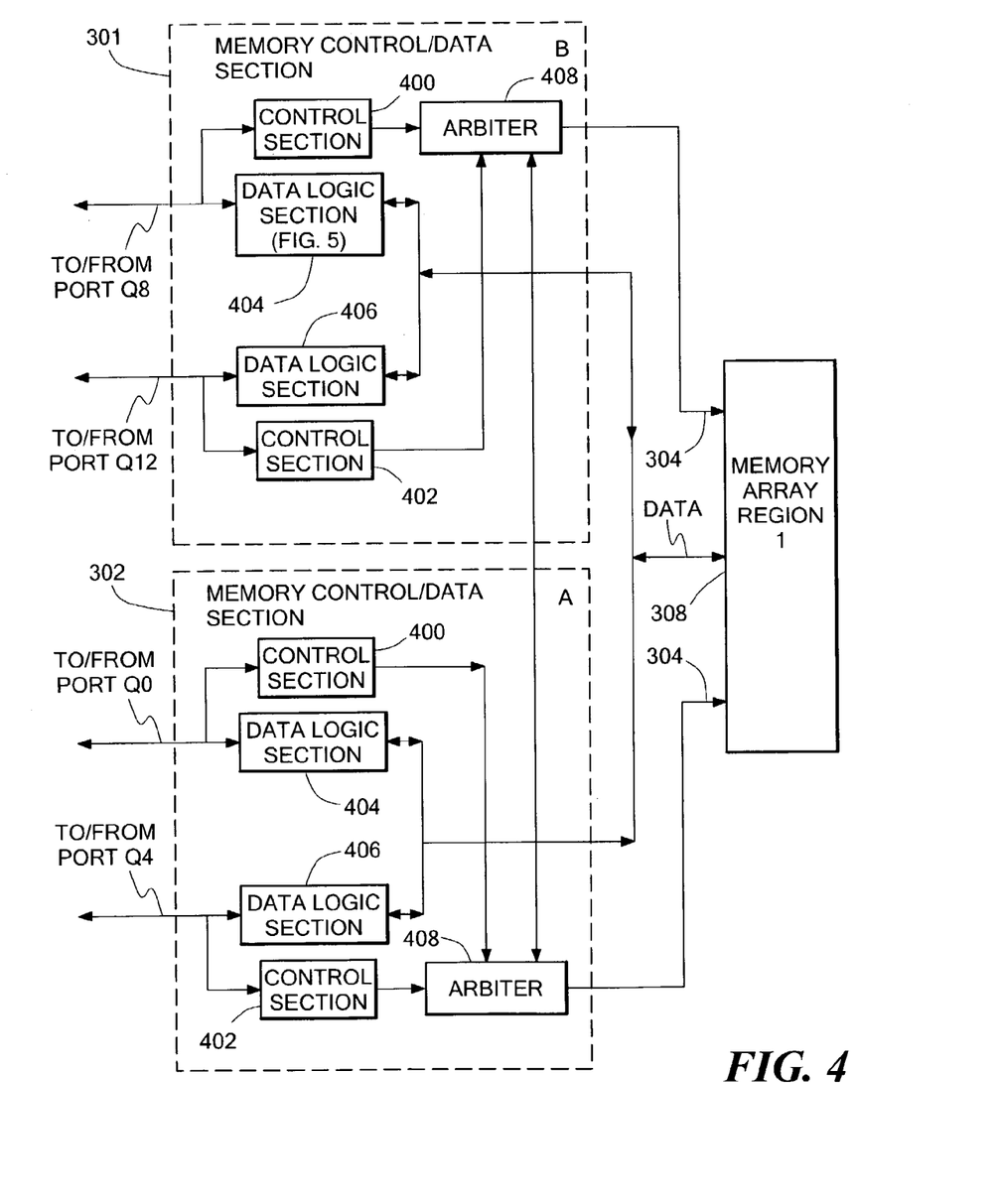
FIG. 4 is a block diagram of a pair of memory control/data sections on the exemplary global memory printed circuit board of FIG. 3, such pair of memory control/data sections being coupled to a corresponding one of a plurality of memory array regions on the memory printed circuit board of FIG. 3.

Referring now to FIG. 4, memory control/data sections $300_1$, $300_2$ are shown in more detail and coupled to the memory array 1. The memory control/data sections $300_1$, $300_2$ each includes a pair of control sections 400, 402; a pair of data logic sections 404, 406; and an arbiter 408. The control section 400 and the data logic section 404 of memory control/data section $300_1$ are coupled to port Q8 (FIG. 3) and the control section 402 and the data logic section 406 of memory control/data section $300_1$ are coupled to port Q12 (FIG. 3). The control section 400 and the data logic section 404 of memory control/data section $300_2$ are coupled to port Q0 (FIG. 3) and the control section 402 and the data logic section 406 of memory control/data section $300_2$ are coupled to port Q4 (FIG. 3). The memory array section 1 has the DATA port 308 thereof coupled the data logic sections 404, 406 in both memory control/data sections $300_1$ and $300_2$, as shown. Memory address and control signals are fed to the memory array region 1 by the control section 400, 402 being granted access to the memory array region 1 by arbitration on for the memory array. Arbitration for access to the memory array region 1 is granted by arbitration is performed between arbiter 408 of memory control/data section $300_1$, and arbiter 408 of memory control/data section $300_2$. Thus, if for example, as a result of the arbitration, arbiter 408 of memory control/data section $300_1$ grants access of the memory array region 1 to data logic section 404 of memory control/data section $300_1$, one of the sixteen directors coupled to port Q8 provides data to be written into, or requests data stored in, a selected address provided by such director. Further, such director may request a read-modify-write operation. More particularly, the director may request an atomic read-modify-write operation on plural bit read data stored in a selected one of a plurality of memory locations of region 1, for example. That is, in each one of the memory locations, i.e., addresses, of the memory array region 1 is here, for example, adapted to store data having sixty-four bits, here designated as bits $C_{63}$–$C_0$, $C_0$ is the least significant, or lowest order, bit and where $C_{63}$ is the most significant, or highest order, bit.

During this particular read-modify-write operation, the director request that input data it provides to the memory be added to the data stored at an address provided by the director, (i.e., read data) and the result, i.e., the sum, or modified data, be written into the memory array region 1 at the same address from which the read data was stored. Also, the director operation requires that the read data (i.e., the data which was read from the memory prior to modification) be returned, unmodified, to the director. Also, this operation must be performed atomically. That is, no other director can have access to the selected address location in memory array region 1 until the modified data is written into such memory location.

In addition, it is required that any portion (i.e., the entire portion or a fractional portion) of the read data in memory be modified by a corresponding portion of the input data supplied by the director. Thus, for example, if the input data supplied by the director is designated as a word having bits $A_{63}$–$A_0$, where $A_0$ is the least significant, or lowest order, bit and $A_{63}$ is the most significant, or highest order bit, the controller may require that the entire sixty-four bit read word (i.e., $C_{63}$–$C_0$) from memory array 1 be added to the entire sixty-four bit input word ($A_{63}$–$A_0$,) supplied by the director and the sum of these two sixty-four bits words be written into memory array region 1.

In another example, the director may require that only bits $C_3$–$C_0$ be added to only bits $A_3$–$A_0$ with the sum being stored in the locations previously occupied by bits $C_3$–$C_0$. In another example, the director may require that bits $C_{19}$–$C_4$ be added to bits $A_{19}$–$A_4$ with the sum being stored in the locations previously occupied by bits $C_{19}$–$C_4$ and simultaneously that bits $C_{63}$–$C_{20}$ be added to bits $A_{63}$–$A_{20}$ with the sum being stored in the locations previously occupied by bits $C_{63}$–$C_{20}$. Such operations are performed in the data logic sections 404, 406 in a manner to be described. The portion of the read data in memory be modified by a corresponding portion of the input data supplied by the director is provided to the data logic section by a carry bit mask $D_{62}$–$D_0$ provided by the requesting director.

It is first noted, for reasons to become apparent, that there is one less bit in the carry bit mask than the number of bits in the word stored in the memory array region 1 that is to be modified, thus, there are only 63 bits in the carry bit mask in this example being described. As will be described, a logic 1 bit establishes a higher order boundary for the portion of the word to be processed.

Thus, in the example above where the director requires that only bits $C_3$–$C_0$ be added to only bits $A_3$–$A_0$, a logic 1 is placed in masks bit $D_3$. In the example above where the director requires that bits $C_{19}$–$C_4$ be added to bits $A_{19}$–$A_4$ and simultaneously that bits $C_{63}$–$C_{20}$ be added to bits $A_{63}$–$A_{20}$, there would be logic 1's at bits $D_3$ and $D_{19}$ of the carry bit mask.

Such modification operations are performed in the data logic sections 404, 406 in a manner to be described. As will be described in more detail below, the arrangement enables a director to perform an atomic read-modify-write operation on plural bit read data stored in a selected one of a plurality of memory locations.

Figure 5:
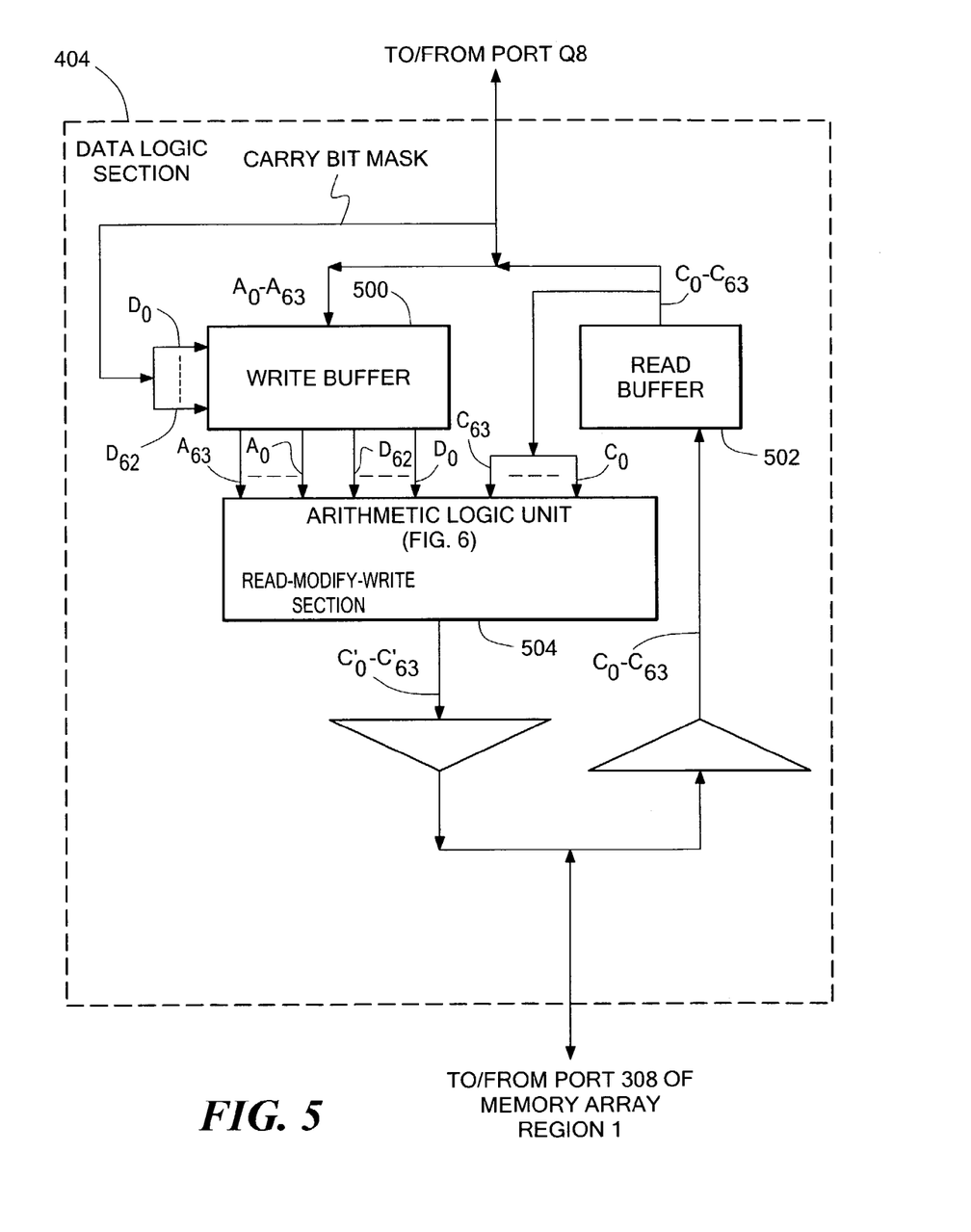
FIG. 5 is a block diagram of an exemplary one of a pair of data logic sections used in one of the pair of memory control/data section of FIG. 4.

An exemplary one of the data logic sections 404, 406, here data logic section 404 is shown in FIG. 5 to include: a write buffer 500; a read buffer 502; and, a read-modify-write unit 504, here an arithmetic logic unit.

As noted above, the portion of the read data in memory be modified by a corresponding portion of the input data supplied by the director is provided to the data logic section by a bits $D_{62}$–$D_0$ of the carry bit mask provided by the requesting director. It is first noted that, for reasons to become apparent, that there is one less bit in the carry bit mask than the number of bits in the word stored in the memory array region 1 that is to be modified, thus, there are only 63 bits in the carry bit mask in the examples being described. Thus, referring to FIG. 5, the director provides on port Q8 the input data ($A_{63}$–$A_0$) and the bits ($D_{62}$–$D_0$) of the carry bit mask, it being understood that the address location in the memory array region 1 at port Q8 is fed to control section 400 (FIG. 4). It is noted that the input data ($A_{63}$–$A_0$) and the carry bit mask (i.e., the logic state of bits $D_{62}$–$D_0$) are provided sequentially to the write buffer 500 and that they are combined into a parallel, 127-bit digital word having both the input data ($A_{63}$–$A_0$) and the bits ($D_{62}$–$D_0$) of a carry bit mask. The data at the location specified by the director, i.e., the unmodified read data ($C_{63}$–$C_0$) is, in response to the read-modify-write request by the controller, retrieved from the memory array region 1 at the director specified address and is: (1) fed back to the requesting director; and (2) is fed to the read-modify-write section 504.

The unmodified read data ($C_{63}$–$C_0$) in read buffer 502 and the 127-bit digital word having both the input data ($A_{63}$–$A_0$) and the bits ($D_{62}$–$D_0$) of a carry bit mask in write buffer 500 are fed to the read-modify-write unit 504, here an arithmetic logic unit.

Figure 6:
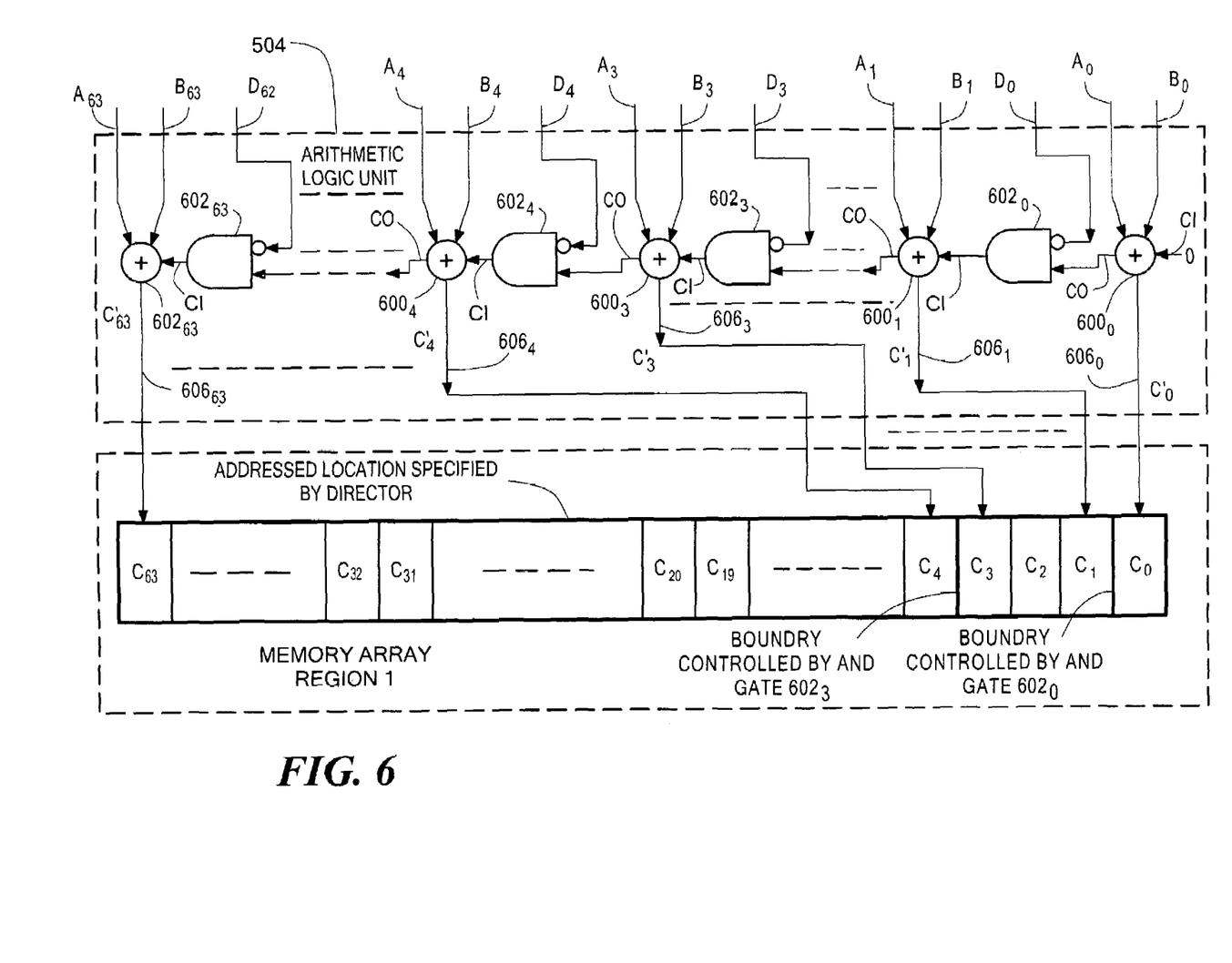
FIG. 6 is a block diagrams of an exemplary read-modify-write unit, here an arithmetic unit, used in the data logic section of FIG. 5.

The read-modify-write unit 504 is shown in FIG. 6 to include a plurality of full adder sections 600$_0$–600$_{63}$. One of the full adder sections 600$_0$–600$_{63}$ is provided for each one of the bits of the read data ($C_{63}$–$C_0$), respectively as indicated. Each one of the full adder sections 600$_0$–600$_{63}$ has a carry bit input CI and a carry bit output CO, except for section 600$_{63}$ which only has a carry bit input CI.

The read-modify-write unit 504 includes a plurality, here sixty-two, logic gates 602$_0$–602$_{62}$. Here, the logic gates are AND gates having a pair of inputs. One of the inputs is an inverting input and is coupled to a corresponding one of the bits $D_0$–$D_{62}$ of a carry bit mask, respectively as indicated. The other one of the inputs is coupled to the carry bit output CO of a preceding full adder section. Thus, the other input of gates 602$_0$–602$_{62}$ are coupled to the carry bit output CO of full adder section 600$_0$–600$_{62}$ (not shown but immediately preceding adder 600$_{63}$), respectively, as indicated.

Each one of the full adders 600$_0$–600$_{63}$ produces a summation output 606$_0$–606$_{63}$, respectively having the least significant bit produced by the adder. The summation output thus has the modified data indicated as $C'_{63}$–$C'_0$. The modified data $C'_{63}$–$C'_0$, is then written back into the memory region 1 at the same location from which unmodified data $C_{63}$–$C_0$ was read.

That is, each one of the full adders 600$_0$–600$_{63}$ produces the least significant bit of the sum of the two bits fed thereto from the input data supplied by the director and the read data from the memory array region on a corresponding one of the summation outputs 606$_0$–606$_{63}$ which is then fed to the memory array region 1 and the bit on the carry bit input (CI) fed to such adder. The adder also produces a carry output on its carry bit output (CO) representative of the most significant bit produced by the full adder, it being noted that the carry out bit may be either a logic 0 or logic 1 depending on the logic states fed to such full adder. Thus, the bits $C'_{63}$–$C'_0$ produced on the summation outputs 606$_0$–606$_{63}$, respectively, by full adders 600$_{63}$–600$_0$, respectively, are fed for storage in memory array region 1 at the address specified by the director to effect the atomic, read-modify-write operation.

It is noted that the carry bit on the carry bit input of full adder 600$_0$ is fixed at logic 0 and that the last adder 600$_{63}$ does not have a carry bit output CO.

It is next noted that the carry bit of an adder will not propagate to the carry bit input (CI) of the next succeeding full adder if the bit of the carry bit mask fed to the AND gate between these two adders is a logic 1. Thus, if for example, full adder 600$_0$ produces a carry bit or logic 1, such carry bit will not pass through gate 602$_0$ to the carry bit input (CI) of full adder 600$_1$ if bit $D_0$ of the carry bit mask is logic 1 but such carry bit will pass through gate 602$_0$ to the carry bit input (CI) of full adder 600$_1$ if bit $D_0$ of the carry bit mask is logic 0. In like manner, if example, full adder 600$_3$ produces a carry bit or logic 1, such carry bit will not pass through gate 602$_4$ to the carry bit input (CI) of full adder 600$_4$ if bit $D_4$ of the carry bit mask is logic 1 but such carry bit will pass through gate 602$_4$ to the carry bit input (CI) of full adder 600$_4$ if $D_4$ of the carry bit mask is logic 0.

Thus, in summary, the arrangement operates by adding each one of a bits of plural bit input data provided by the director with a corresponding one of the bits of the plural bit read data in the provided full adder together with a carry bit fed the carry bit input of such provided full adder. The full adder provides: a carry bit; and, a summation of the bits fed to such provided full adder to the corresponding bit location in the selected one of a plurality of memory locations. The system selectively couples, or inhibits coupling, a carry bit produced by one full adder provided for a lower order bit of the plural bit read data to the carry bit input of a second full adder provided by for next, successive higher order bit of the plural bit read data selectively in accordance with a bit of the carry bit mask provided by the director.

With such system and method, a plurality of successive full adders is provided. Each one of the full adders is associated with a corresponding one of the bits of the plural bit read data. Each one of the full adders has a summation output, a carry bit input and a carry bit output. The method includes adding in each one of the full adders: (a) a corresponding bit of plural bit input data provided by the director; (b) the corresponding one of the bits of the plural bit read data; and, (c) a carry bit fed the carry bit input from a preceding full adder. Each one of the full adders provides: (a) a carry bit on the carry output thereof representative of the most significant bit produced by the full adder; and, (b) a bit on the summation output representative of a least significant bit produced by the full adder. The bit on the summation output is stored in a corresponding bit location in the selected one of a plurality of memory locations. The method selectively couples, or inhibits coupling, the carry bit produced from one of the full adders to the carry bit input of a next successive full adder selectively in accordance with a corresponding bit of a plural bit carry bit mask provided by the director.

Thus, the summation may be performed on read data of arbitrary length and position in the selected memory location. Also, multiple portions of the read data may be simultaneously added to corresponding multiple portions of the input data provided by the director. The bits of a carry bit mask provided by the director control whether the carry bit will be forward, (i.e., carry bit of the preceding order adder), will pass as to the carry bit input of the next higher order adder. Thus, inhibiting coupling of an carry bit establishes a boundary between the most significant bit of a lower order portion of the read data and the least significant bit of the next higher order portion of such read data. Coupling all carry bits enables the entire read data to be added to the entire input data.

Other embodiments are within the spirit and scope of the appended claims.

What is claimed is:

1. A method for a director to perform an atomic read-modify-write operation on plural bit read data stored in a selected one of a plurality of memory locations, comprising:
   providing a plurality of successive full adders, each one of the full adders being associated with a corresponding one of the bits of the plural bit read data, each one of the full adders having: a summation output; a carry bit input; and a carry bit output;
   summing in each one of the full adders: (a) a corresponding bit of plural bit input data provided by the director; (b) the corresponding one of the bits of the plural bit read data; and, (c) a carry bit fed the carry bit input from a preceding full adder, each one of the full adders producing: (a) a carry bit on the carry output thereof representative of the most significant bit produced by the full adder; and, (b) a bit on the summation output representative of a least significant bit produced by the full adder;
   storing the summation output in a corresponding bit location in the selected one of a plurality of memory locations; and
   selectively coupling, or inhibited from coupling, the carry bit produced by one of the full adders to the carry bit input of a next successive full adder selectively in accordance with a corresponding bit of a plural bit carry bit mask provided by the director.

2. A method for selectively modifying at least one bit of plural bit data read from a memory, comprising:
   reading the plural bit data from the memory from a selected one of a plurality of memory addresses;
   feeding each one of the bits of the plural bit input data and each one of the bits of the plural bit data read from the memory from the selected one of a plurality of memory addresses to a corresponding one of a plurality of successively coupled full adder sections, each one of adder sections having a carry bit input, a carry bit output; and a summation output;
   coupling, or inhibiting from such coupling, the carry bit output produced by each one of the carry bit input of the succeeding one of the full adder sections selectively in accordance with a corresponding one of the bits of the plural bit mask data; coupling the summation output of each one of the full adder sections to a corresponding one of a plurality of bit storage locations in the memory, the plurality of bit storage locations having the selected one of the plurality of memory addresses.

3. A system, comprising:
   (A) a memory printed circuit board, such printed circuit board having a memory;
   (B) a plurality of directors, each one being coupled to the memory board by a bus, such directors providing control and address signals to the memory to read data stored in such memory and to write data into such memory;
   (C) a logic section disposed on the memory printed circuit board, such logic section being coupled between the memory and the plurality of directors, such logic section comprising:
     (a) a write buffer for receiving the write data from the plurality of directors;
     (b) a read buffer for receiving read data from the memory at an address provided by the address signal, such read buffer providing such read data from the memory to the plurality of directors and to the write buffer; and
     (c) a read-modify-write unit fed by: the write data and the read data from the memory and received by the read buffer, such read-modify-write unit processing the write data and the read data in the read buffer and the write buffer and for feeding such processed data for storage in such memory at an address provided by the address signal.

4. A read-modify-write system, comprising:
   (a) a memory;
   (b) a write buffer for receiving data, such data comprising: plural bit write data; and plural bit carry bit mask data;
   (c) a read buffer for receiving plural bit data read from the memory, such read buffer providing such plural bit data read from the memory at an address;
   (d) an arithmetic unit fed by: the plural bit write data and the plural bit carry bit mask received in the write buffer; and, the plural bit data read from the memory and received by the read buffer, such arithmetic unit comprising:
     (i) a plurality of successively arranged full adder sections, each one of such full adder sections having:
       a pair of data bit inputs; and
       a carry bit input; and
       wherein the pair of data bit inputs are coupled to a corresponding one of the plural bits of the write data and a corresponding one of the plural bits of the data received by the read buffer;
       each one of the full adder sections producing:
         a summation bit; and,
         a carry bit, such summation bit being fed to the memory for storage in such memory at the address; and
     (ii) a plurality of gates, each one of the gates having one input fed by the carry bit produced by a preceding one of the successively arranged adder sections and another input fed by a corresponding one of bits of a carry bit mask, each one of such gates having an output coupled to the carry bit input of a succeeding one of the successively arranged adder section each one of such gates passing, or inhibiting from passing, the carry bit fed thereto to the output thereof selectively in accordance with the carry bit coupled to the carry bit input thereof.

5. A read-modify-write system, comprising:
(A) a memory;
(B) a director coupled to the memory for providing control signals to the memory to read data stored in such memory and to write data to be stored in such memory at an address provided by an address signal;
(C) a read-modify-write unit coupled between the memory and the director, comprising:
   (a) a write buffer for receiving the data from the director, such data comprising: plural bit write data; and plural bit carry bit mask data;
   (b) a read buffer for receiving plural bit data read from the memory at the address provided by the address signal, such read buffer providing such plural bit data read from the memory to the director and to the write buffer;
   (c) an arithmetic unit fed by: the plural bit data and the plural bit carry bit mask data received in the write buffer; and, the plural bit data read from the memory and received by the read buffer, such arithmetic unit comprising a full adder, such full adder comprising a plurality of successively arranged full adder sections, each one of such full adder sections having a pair of data bit inputs and a carry bit input, the pair of data bit inputs being coupled to a corresponding one of the plural bits of the write data and a corresponding one of the plural bits of the data received by the read buffer, each one of the adder sections producing: a summation bit; and, a carry bit, such summation bit being fed to the memory for storage in such memory at the address provided by the address signal; and
   (d) wherein the arithmetic section includes a plurality of gates, each one of the gates having one input fed by the carry bit produced by a preceding one of the successively arranged adder sections and another input fed by a corresponding one of the bits of a carry bit mask, each one of such gates having an output coupled to the carry bit input of a succeeding one of the successively arranged adder section each one of such gates passing, or inhibiting from passing, the carry bit fed thereto to the output thereof selectively in accordance with the carry bit coupled to the carry bit input thereof.

6. A system, comprising:
(A) a memory;
(B) a plurality of directors, each one being coupled to the memory for providing control and address signals to the memory to read data stored in such memory and to write data into such memory;
(C) a logic section coupled between the memory and the plurality of directors, such logic section comprising:
   (i) a data logic section for processing data passing between the memory and the plurality of directors;
   (ii) a control section coupled to the plurality of directors for providing the address and control signals to the memory in response to address and control signals fed thereto by the plurality of directors;
   (iii) wherein such data logic section comprises:
      (a) a write buffer for receiving data from the plurality of directors, such data comprising: plural bit write data and plural bit carry bit mask;
      (b) a read buffer for receiving plural bit data read from the memory at an address provided by the address signal, such read buffer providing such data read from the memory to the plurality of directors and to the write buffer;
      (c) an arithmetic unit fed by: the plural bit write data and the plural bit carry bit mask received in the write buffer; and, the plural bit data read from the memory and received by the read buffer, such arithmetic unit comprising a plurality of successively arranged full adder sections, each one of such full adder sections having a pair of data bit inputs and a carry bit input, the pair of data bit inputs being coupled to a corresponding one of the plural bits of the write data and a corresponding one of the plural bits of the data received by the read buffer, each one of the adder sections producing: a summation bit and a carry bit, such summation bit being fed to the memory for storage in such memory at the address provided by the address signal; and
      (d) wherein such arithmetic unit includes a plurality of gates, each one of the gates having one input fed by the carry bit produced by a preceding one of the successively arranged adder sections and another input fed by a corresponding one of the bits of the carry bit mask, each one of such gates having an output coupled to the carry bit input of a succeeding one of the successively arranged adder section, each one of such gates passing, or inhibiting from passing, the carry bit fed thereto to the output thereof selectively in accordance with the carry bit coupled to the carry bit input thereof.

* * * * *